(12) United States Patent
Thomas

(10) Patent No.: US 10,117,387 B2
(45) Date of Patent: Nov. 6, 2018

(54) BRUSH CLEARING ASSEMBLY

(71) Applicant: Paul Thomas, Corning, NY (US)

(72) Inventor: Paul Thomas, Corning, NY (US)

( * ) Notice: Subject to any disclaimer, the term of this patent is extended or adjusted under 35 U.S.C. 154(b) by 288 days.

(21) Appl. No.: 15/060,977

(22) Filed: Mar. 4, 2016

(65) Prior Publication Data

US 2017/0251593 A1 Sep. 7, 2017

(51) Int. Cl.
*A01G 23/06* (2006.01)
*A01D 34/01* (2006.01)
*A01D 45/00* (2018.01)
*A01D 67/00* (2006.01)
*A01D 101/00* (2006.01)

(52) U.S. Cl.
CPC ........... *A01G 23/06* (2013.01); *A01D 34/015* (2013.01); *A01D 45/00* (2013.01); *A01D 67/005* (2013.01); *A01D 2101/00* (2013.01)

(58) Field of Classification Search
CPC ...... A01G 23/06; A01G 23/08; A01D 34/015; A01D 45/00; A01D 67/005; A01D 2101/00; B60D 1/00; B60D 1/04; B60D 1/167; B60D 1/182; B60D 1/249; B60D 1/34; B60D 1/345; B60D 1/52; B60D 1/145; B60D 1/485
USPC .......................................................... 37/302
See application file for complete search history.

(56) References Cited

U.S. PATENT DOCUMENTS

| | | | | |
|---|---|---|---|---|
| 22,917 | A * | 2/1859 | Hall | F16G 11/12 254/199 |
| 1,357,577 | A * | 11/1920 | Mazuryk | A01G 23/062 254/199 |
| 1,396,657 | A * | 11/1921 | Nissrod | A01G 23/06 37/302 |
| 1,676,040 | A * | 7/1928 | Meunier | A01G 23/06 37/302 |
| D149,909 | S | 6/1948 | Scarlet | |
| 2,505,923 | A * | 5/1950 | Taylor | A01G 23/065 254/132 |
| 2,535,099 | A | 12/1950 | Slick | |
| 2,613,458 | A * | 10/1952 | Harrell | A01G 23/06 294/104 |
| 2,950,546 | A * | 8/1960 | Wigginton | A01G 23/06 37/301 |
| 3,338,594 | A * | 8/1967 | Schuler | A01B 59/042 172/248 |
| 3,403,928 | A * | 10/1968 | Laughlin | B60D 1/345 280/406.2 |
| 3,529,852 | A * | 9/1970 | Kellington | A01B 59/043 172/443 |

(Continued)

FOREIGN PATENT DOCUMENTS

WO WO2004082364 9/2004

*Primary Examiner* — Jessica H Lutz

(57) ABSTRACT

A brush clearing assembly includes a mounting unit that may be coupled to a tractor. A hooking unit may be coupled to the tractor thereby facilitating the tractor to draw the hooking unit. The hooking unit is movably coupled to the mounting unit. The hooking unit may engage a trunk of a bush when the tractor backs toward the bush. The hooking unit slides laterally in the mounting unit when the hooking unit engages the trunk of the bush. Thus, the hooking unit slides along the trunk of the bush until the hooking unit passes beyond the trunk of the bush. The hooking unit removes the bush when the tractor drives forwardly from the bush.

9 Claims, 4 Drawing Sheets

(56) References Cited

U.S. PATENT DOCUMENTS

| | | | | |
|---|---|---|---|---|
| 3,552,772 | A | * | 1/1971 | Scott ................ B62D 49/065 |
| | | | | 280/405.1 |
| 3,554,576 | A | * | 1/1971 | Parker ................ B62D 63/06 |
| | | | | 267/292 |
| 3,650,331 | A | * | 3/1972 | Dedoes ............... A01B 29/045 |
| | | | | 172/21 |
| 3,717,984 | A | * | 2/1973 | Wright ............... A01D 34/015 |
| | | | | 56/229 |
| 3,951,188 | A | * | 4/1976 | Dawson .............. A01G 23/097 |
| | | | | 144/24.13 |
| 4,547,984 | A | | 10/1985 | Adams |
| 5,067,261 | A | * | 11/1991 | Betts ................. A01G 23/06 |
| | | | | 144/34.2 |
| 5,516,250 | A | | 5/1996 | Sawyer |
| 5,526,637 | A | | 6/1996 | Leonard |
| 6,443,474 | B1 | * | 9/2002 | Kay .................. B60D 1/145 |
| | | | | 280/457 |
| 2010/0123110 | A1 | * | 5/2010 | Molino ............... A01G 23/02 |
| | | | | 254/132 |
| 2010/0219387 | A1 | * | 9/2010 | Molino ............... A01G 23/02 |
| | | | | 254/132 |

\* cited by examiner

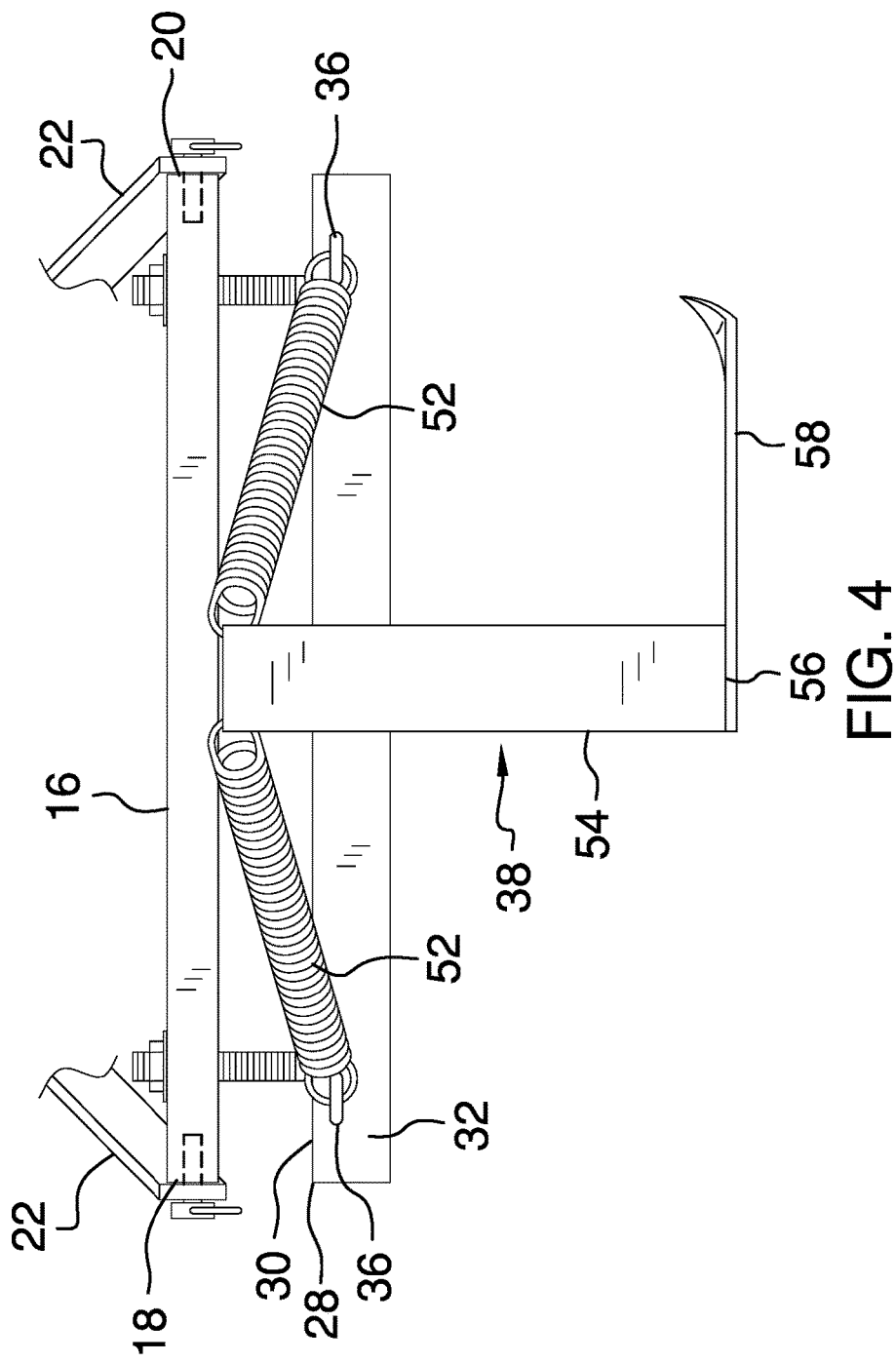

BRUSH CLEARING ASSEMBLY

BACKGROUND OF THE DISCLOSURE

Field of the Disclosure

The disclosure relates to clearing devices and more particularly pertains to a new clearing device for removing brush from ground without requiring a user to dismount a tractor.

SUMMARY OF THE DISCLOSURE

An embodiment of the disclosure meets the needs presented above by generally comprising a mounting unit that may be coupled to a tractor. A hooking unit is provided. The hooking unit may be coupled to the tractor thereby facilitating the tractor to draw the hooking unit. The hooking unit is movably coupled to the mounting unit. The hooking unit may engage a trunk of a bush when the tractor backs toward the bush. The hooking unit slides laterally in the mounting unit when the hooking unit engages the trunk of the bush. Thus, the hooking unit slides along the trunk of the bush until the hooking unit passes beyond the trunk of the bush. The hooking unit removes the bush when the tractor drives forwardly from the bush.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a back view of an embodiment of the disclosure.

DESCRIPTION OF THE PREFERRED EMBODIMENT

Figure 1:
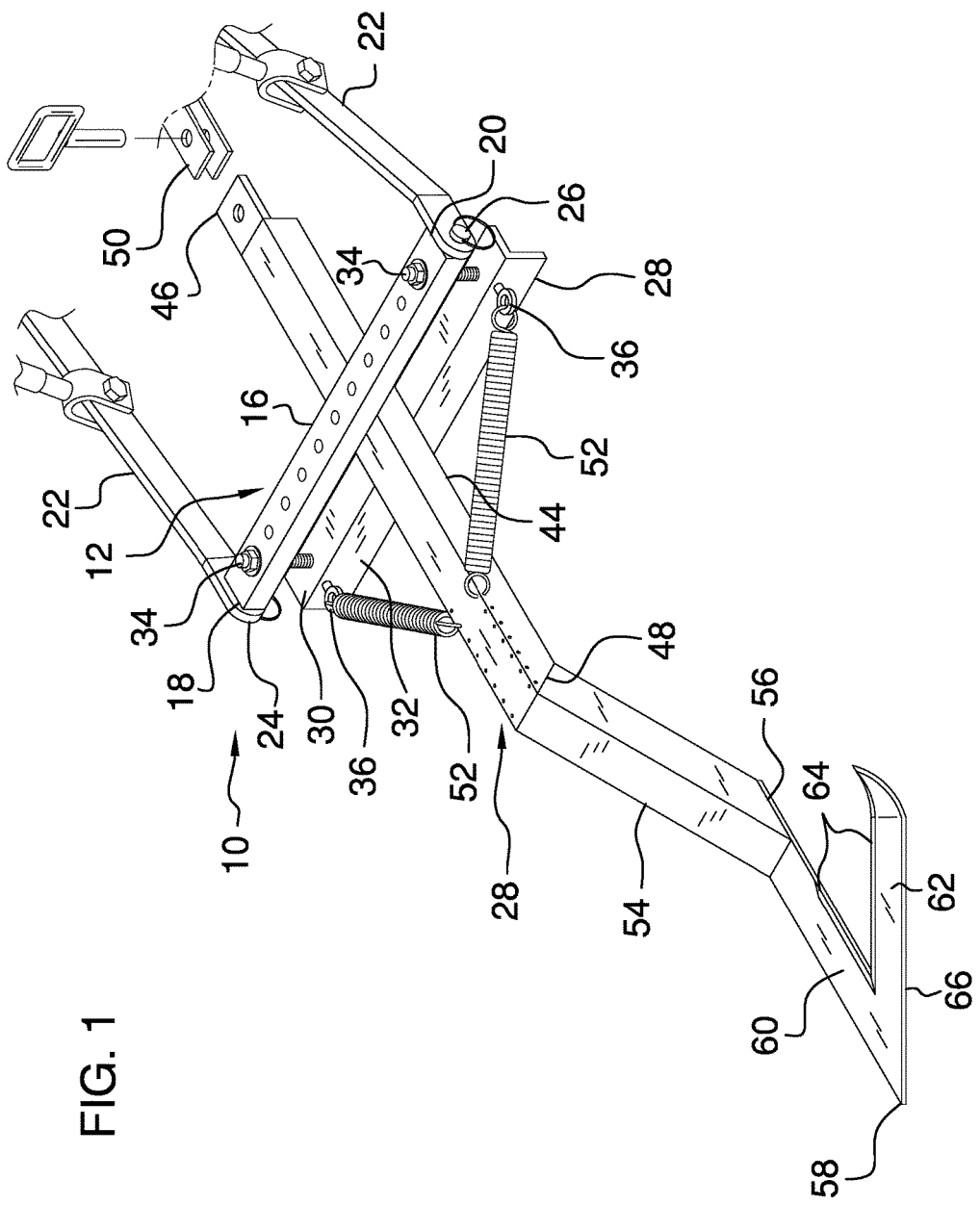
FIG. 1 is a top perspective view of a brush clearing assembly according to an embodiment of the disclosure.
Figure 2:
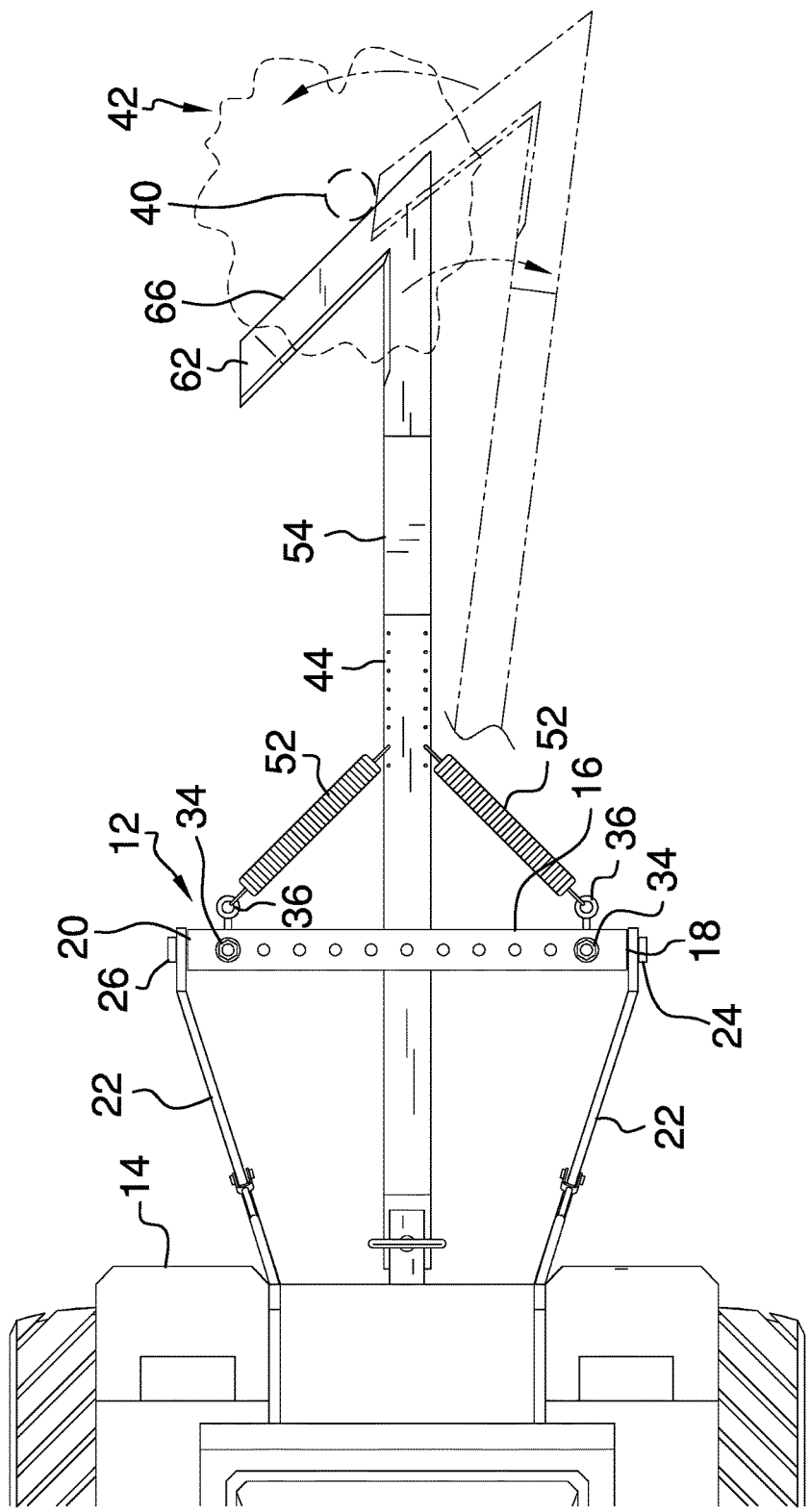
FIG. 2 is a top view of an embodiment of the disclosure.
Figure 3:
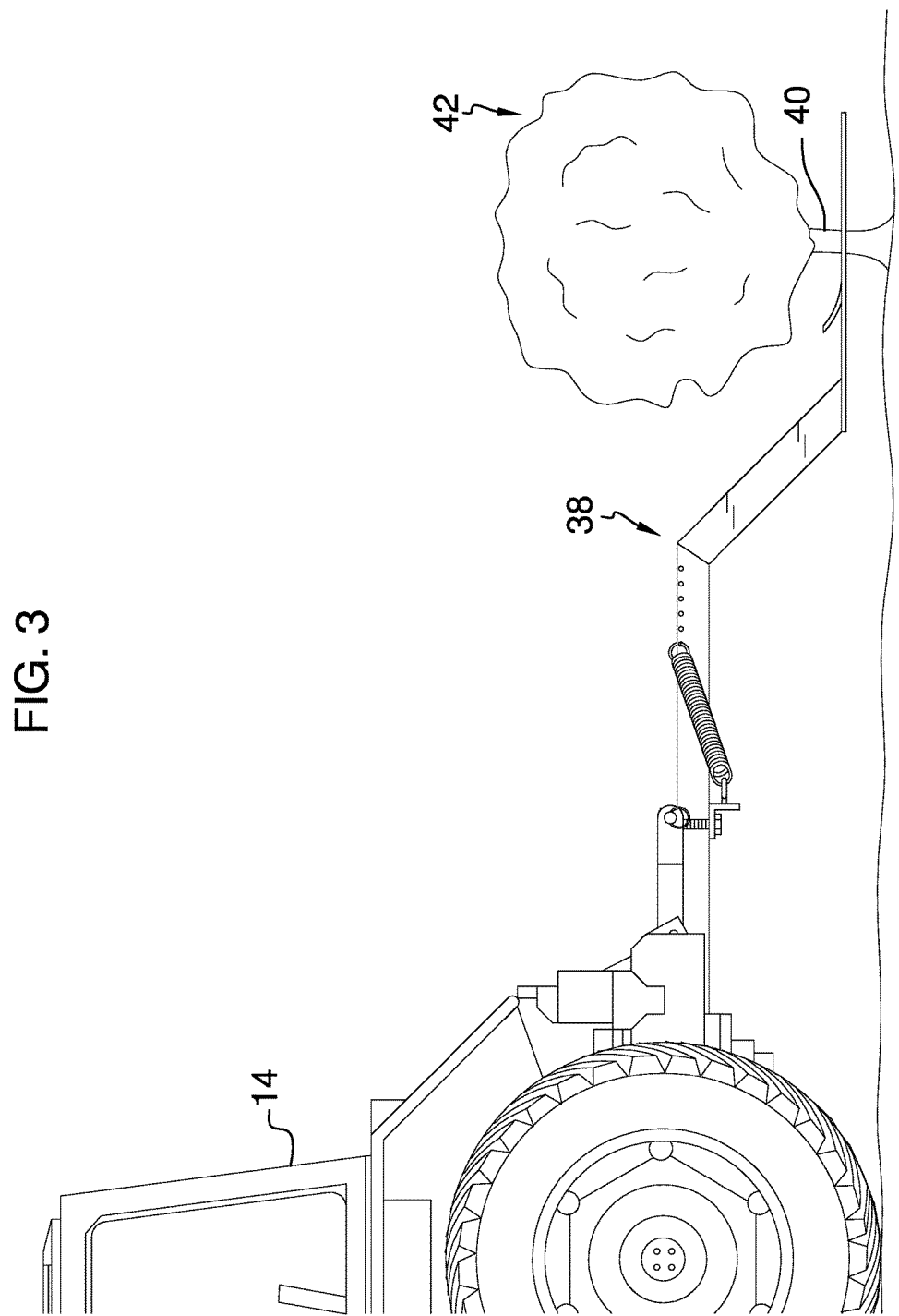
FIG. 3 is a perspective in-use view of an embodiment of the disclosure.

With reference now to the drawings, and in particular to FIGS. 1 through 4 thereof, a new clearing device embodying the principles and concepts of an embodiment of the disclosure and generally designated by the reference numeral 10 will be described.

As best illustrated in FIGS. 1 through 4, the brush clearing assembly 10 generally comprises a mounting unit 12 that may be coupled to a tractor 14. The tractor 14 may comprise a farm tractor or the like. The mounting unit 12 includes a first member 16 that has a first end 18 and a second end 20. Each of the first end 18 and the second end 20 may be removably coupled to an associated one of a pair of draw arms 22 on the tractor 14.

A first pin 24 is provided. The first pin 24 extends through an associated draw arm 22 and engages the first end 18 of the first member 16. Thus, the first pin 24 couples the first end 18 to the associated draw arm 22. A second pin 26 is provided. The second pin 26 extends through an associated draw arm 22 and engages the second end 20 of the first member 16. Thus, the second pin 26 couples the second end 20 to the associated draw arm 22.

The mounting unit 12 further includes a second member 28. The second member 28 has a first portion 30 forming an angle with respect to a second portion 32. A pair of bolts 34 is provided. Each of the bolts 34 extends through the first member 16 and engages the first portion 30 of the second member 28.

The second member 28 is coupled to the first member 16 having the second member 28 being spaced from the first member 16. The first portion 30 lies on a plane that is planar with respect to the first member 16. The second portion 32 lies on a plane that is oriented perpendicular to the first member 16. The second member 28 is coextensive with the first member 16.

A pair of hooks 36 is provided. Each of the hooks 36 is coupled to the second portion 32 of the second member 28. The hooks 36 are spaced apart from each other. Each of the hooks 36 may comprise an eye bolt or the like.

A hooking unit 38 is provided. The hooking unit 38 may be coupled to the tractor 14 thereby facilitating the tractor 14 to draw the hooking unit 38. The hooking unit 38 is movably coupled to the mounting unit 12. The hooking unit 12 may engage a trunk 40 of a bush 42 when the tractor 14 backs toward the bush 42. The hooking unit 38 slides laterally in the mounting unit 12 when the hooking unit 38 engages the trunk 40 of the bush 42. Thus, the hooking unit 38 may slide along the trunk 40 of the bush 42 until the hooking unit 38 passes beyond the trunk 40 of the bush 42.

The hooking unit 38 is biased to be centrally positioned in the mounting unit 12. Thus, the hooking unit 38 is positioned to grip the trunk 40 of the bush 42 when the hooking unit 38 passes beyond the trunk 40 of the bush 42. The hooking unit 38 may remove the bush when the tractor drives forwardly from the bush. The bush may be a multi-flora rose, honeysuckle or other brush growing in non developed land.

The hooking unit 38 comprises a first arm 44. The first arm 44 has a primary end 46 and a secondary end 48. The first arm 44 extends between the first member 16 and the second member 28. The primary end 46 may be removably coupled to a hitch 50 on the tractor 14.

A pair of biasing members 52 is provided. Each of the biasing members 52 is coupled between the first arm 44 and an associated one of the hooks 36 on the second member 28. Each of the biasing members 52 biases the first arm 44 to be centrally positioned between the first end 18 and the second end 20 of the first member 16. Each of the biasing members 52 may comprise a spring or the like.

A second arm 54 is coupled to the secondary end 48 of the first arm 44. The second arm 54 has a distal end 56 with respect to the first arm 44. The second arm 54 angles downwardly away from the first arm 44. Thus, the distal end 56 is positioned below the first arm 44.

A hook 58 is provided. The hook 58 has a primary portion 60 forming an angle with respect to a secondary portion 62 such that the hook 58 has a V-shape. The primary portion 60 is coupled to the distal end 56. The primary portion 60 is oriented parallel with the first arm 44. The secondary portion 62 is directed toward the mounting unit 12.

Each of the primary portion 60 and the secondary portion 62 has a first edge 64. The first edge 64 corresponding to each of the primary portion 60 and the secondary portion 62 is sharpened. The secondary portion 62 has a second edge 66. The second edge 66 may frictionally engage the trunk 40 of the bush 42 when the tractor 14 backs toward the bush 42.

The hook 58 is urged laterally on the mounting unit 12 when the second edge 66 frictionally engages the trunk 40 of the bush 42. Thus, the hook 58 may pass beyond the trunk 40 of the bush 42 when the tractor 14 backs toward the bush 42. The biasing members 52 bias the hook 58 to be centrally positioned on the mounting member 12 when the hook 58 passes beyond the trunk 40 of the bush 42. Thus, the hook 58 may be positioned to grip the trunk 40 of the bush 42 when the tractor 14 drives away from the bush 42 thereby facilitating the bush 42 to be extracted.

In use, each of the mounting unit 12 and the hooking unit 38 are coupled to the tractor 14. The tractor 14 is backed toward the bush 42 when the bush 42 is to be extracted. The second edge 66 of the hook 58 frictionally engages the trunk 40 of the bush 42. The hooking unit 38 is urged laterally along the mounting unit 12 as the tractor 14 backs toward the bush 42. The hooking unit 38 is biased to be centrally positioned on the mounting unit 12 when the secondary portion 62 of the hook 58 passes beyond the trunk 40.

The tractor 14 is driven forwardly with respect to the bush 42 when the hook 58 passes beyond the trunk 40 of the bush 42. The trunk 40 frictionally engages the hook 58 at an intersection of the primary portion 60 and the secondary portion 62. Thus, the first edge 64 of the hook 58 engages the trunk 40. The tractor 14 pulls the bush 42 outwardly from ground when the tractor 14 is driven forwardly. The first edge 64 of the hook 58 slices through the trunk 40 if the bush 42 resists being removed from ground. The hooking unit 38 facilitates the bush 42 to be removed without requiring a user to dismount the tractor 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A brush clearing assembly being configured to be movably coupled to a tractor thereby facilitating said brush clearing assembly to engage and remove brush, said assembly comprising:

a mounting unit being configured to be coupled to a tractor, said mounting unit comprising
 a first member having a first end and a second end,
 a second member, and
 a pair of hooks, each of said hooks being coupled to said second member; and
a hooking unit being configured to be coupled to the tractor thereby facilitating the tractor to draw said hooking unit, said hooking unit being movably coupled to said mounting unit, said hooking unit being configured to engage a trunk of a bush when the tractor backs toward the bush, said hooking unit being slidable laterally in said mounting unit when said hooking unit engages the trunk of the bush wherein said hooking unit is configured to slide along the trunk of the bush until said hooking unit passes beyond the trunk of the bush, said hooking unit being biased to be centrally positioned in said mounting unit wherein said hooking unit is configured to be positioned to grip the trunk of the bush when said hooking unit passes beyond the trunk of the bush thereby facilitating said hooking unit to remove the bush when the tractor drives forwardly from the bush, said hooking unit comprising
 a first arm having a primary end and a secondary end, said first arm extending between said first member and said second member wherein said primary end is configured to be removably coupled to a hitch on the tractor, and
 a pair of biasing members, each of said biasing members being coupled between said first arm and an associated one of said hooks on said second member, each of said biasing members biasing said first arm to be centrally positioned between said first end and said second end of said first member.

2. The assembly according to claim 1, wherein said mounting unit comprises:
 a first member having a first end and a second end, each of said first end and said second end being configured to be removably coupled to an associated one of a pair of draw arms on the tractor;
 a first pin, said first pin extending through an associated draw arm and engaging said first end of said first member wherein said first pin is configured to couple said first end to the associated draw arm; and
 a second pin, said second pin extending through an associated draw arm and engaging said second end of said first member wherein said second pin is configured to couple said second end to the associated draw arm.

3. The assembly according to claim 2, further comprising:
 a second member having a first portion forming an angle with respect to a second portion; and
 a pair of bolts, each of said bolts extending through said first member and engaging said first portion of said second member such that said second member is coupled to said first member having said second member being spaced from said first member, said first portion lying on a plane being planar with respect to said first member, said second portion lying on a plane being oriented perpendicular to said first member, said second member being coextensive with said first member.

4. The assembly according to claim 3, further comprising a pair of hooks, each of said hooks being coupled to said second portion of said second member, said hooks being spaced apart from each other.

5. The assembly according to claim 1, further comprising a second arm being coupled to said secondary end of said first arm, said second arm having a distal end with respect to said first arm, said second arm angling downwardly away from said first arm such that said distal end is positioned below said first arm.

6. The assembly according to claim 5, further comprising a hook having a primary portion forming an angle with respect to a secondary portion such that said hook has a V-shape, said primary portion being coupled to said distal end such that said primary portion is oriented parallel with said first arm having said secondary portion being directed toward said mounting unit.

7. The assembly according to claim 6, wherein each of said primary portion and said secondary portion has a first edge, said first edge corresponding to each of said primary portion and said secondary portion being sharpened, said secondary portion having a second edge, said second edge being configured to frictionally engage the trunk of the bush when the tractor backs toward the bush, said hook being urged laterally on said mounting unit when said second edge frictionally engages the trunk of the bush wherein said hook is configured to pass beyond the trunk of the bush.

8. The assembly according to claim 7, wherein said biasing members bias said hook to be centrally positioned on said mounting member when said hook passes beyond the trunk of the bush wherein said hook is configured to be positioned to grip the trunk of the bush when the tractor drives away from the bush thereby facilitating the bush to be extracted.

9. A brush clearing assembly being configured to be movably coupled to a tractor thereby facilitating said brush clearing assembly to engage and remove brush, said assembly comprising:
  a mounting unit being configured to be coupled to a tractor, said mounting unit comprising:
    a first member having a first end and a second end, each of said first end and said second end being configured to be removably coupled to an associated one of a pair of draw arms on the tractor,
    a first pin, said first pin extending through an associated draw arm and engaging said first end of said first member wherein said first pin is configured to couple said first end to the associated draw arm,
    a second pin, said second pin extending through an associated draw arm and engaging said second end of said first member wherein said second pin is configured to couple said second end to the associated draw arm,
    a second member having a first portion forming an angle with respect to a second portion,
    a pair of bolts, each of said bolts extending through said first member and engaging said first portion of said second member such that said second member is coupled to said first member having said second member being spaced from said first member, said first portion lying on a plane being planar with respect to said first member, said second portion lying on a plane being oriented perpendicular to said first member, said second member being coextensive with said first member, and
    a pair of hooks, each of said hooks being coupled to said second portion of said second member, said hooks being spaced apart from each other; and
  a hooking unit being configured to be coupled to the tractor thereby facilitating the tractor to draw said hooking unit, said hooking unit being movably coupled to said mounting unit, said hooking unit being configured to engage a trunk of a bush when the tractor backs toward the bush, said hooking unit being slidable laterally in said mounting unit when said hooking unit engages the trunk of the bush wherein said hooking unit is configured to slide along the trunk of the bush until said hooking unit passes beyond the trunk of the bush, said hooking unit being biased to be centrally positioned in said mounting unit wherein said hooking unit is configured to be positioned to grip the trunk of the bush when said hooking unit passes beyond the trunk of the bush thereby facilitating said hooking unit to remove the bush when the tractor drives forwardly from the bush, said hooking unit comprising:
    a first arm having a primary end and a secondary end, said first arm extending between said first member and said second member wherein said primary end is configured to be removably coupled to a hitch on the tractor,
    a pair of biasing members, each of said biasing members being coupled between said first arm and an associated one of said hooks on said second member, each of said biasing members biasing said first arm to be centrally positioned between said first end and said second end of said first member,
    a second arm being coupled to said secondary end of said first arm, said second arm having a distal end with respect to said first arm, said second arm angling downwardly away from said first arm such that said distal end is positioned below said first arm, and
    a hook having a primary portion forming an angle with respect to a secondary portion such that said hook has a V-shape, said primary portion being coupled to said distal end such that said primary portion is oriented parallel with said first arm having said secondary portion being directed toward said mounting unit, each of said primary portion and said secondary portion having a first edge, said first edge corresponding to each of said primary portion and said secondary portion being sharpened, said secondary portion having a second edge, said second edge being configured to frictionally engage the trunk of the bush when the tractor backs toward the bush, said hook being urged laterally on said mounting unit when said second edge frictionally engages the trunk of the bush wherein said hook is configured to pass beyond the trunk of the bush, said biasing members biasing said hook to be centrally positioned on said mounting member when said hook passes beyond the trunk of the bush wherein said hook is configured to be positioned to grip the trunk of the bush when the tractor drives away from the bush thereby facilitating the bush to be extracted.

* * * * *